US010661896B2

(12) United States Patent
Ozaki (10) Patent No.: US 10,661,896 B2
(45) Date of Patent: May 26, 2020

(54) HELICOPTER (71) Applicant: Yanmar Co., Ltd., Osaka-shi, Osaka (JP)

(72) Inventor: Eiichi Ozaki, Osaka (JP)

(73) Assignee: YANMAR CO., LTD., Osaka (JP)

(*) Notice: Subject to any disclaimer, the term of this patent is extended or adjusted under 35 U.S.C. 154(b) by 348 days.

(21) Appl. No.: 15/521,522

(22) PCT Filed: Jul. 7, 2015

(86) PCT No.: PCT/JP2015/003403
§ 371 (c)(1),
(2) Date: Apr. 24, 2017

(87) PCT Pub. No.: WO2016/067488
PCT Pub. Date: May 6, 2016

(65) Prior Publication Data
US 2017/0305548 A1    Oct. 26, 2017

(30) Foreign Application Priority Data
Oct. 29, 2014 (JP) ................... 2014-220462

(51) Int. Cl.
*B64D 27/24* (2006.01)
*B64D 27/04* (2006.01)
(Continued)

(52) U.S. Cl.
CPC ............ *B64C 39/024* (2013.01); *B64C 27/08* (2013.01); *B64C 39/02* (2013.01); *B64D 27/04* (2013.01);
(Continued)

(58) Field of Classification Search
CPC ........ B64C 2201/042; B64C 2201/108; B64C 2201/066; B64C 27/00; B64C 27/006;
(Continued)

(56) References Cited

U.S. PATENT DOCUMENTS 4,955,560 A    9/1990  Nishida et al.
8,469,306 B2 * 6/2013  Kuhn, Jr. ............ B64C 29/0033
                                                         244/12.4
(Continued)

FOREIGN PATENT DOCUMENTS

CN    102933461 A    2/2013
CN    102971216 A    3/2013
(Continued)

OTHER PUBLICATIONS

Multicopter Evolutionary Theory, Radio Control Technology, Radio Experiment Co., Ltd., Apr. 10, 2014, p. 35.
(Continued)

*Primary Examiner* — James S Bergin
(74) *Attorney, Agent, or Firm* — Norton Rose Fulbright US LLP (57) ABSTRACT

A multicopter having a plurality of propellers is provided with electric motors, at least one main battery, a generator, and an engine. The electric motors drive the propellers. The main battery is a first electric power source that supplies the electric power to the electric motors. The generator is a second electric power source that supplies the electric power to the electric motors. The engine drives the generator. When a remaining capacity of the main battery is less than a threshold, the generator charges the main battery with the electric power that has been converted from motive power from the engine.

19 Claims, 9 Drawing Sheets

(51) Int. Cl.
*B64D 41/00* (2006.01)
*B64C 39/02* (2006.01)
*B64C 27/08* (2006.01)
*B64D 27/02* (2006.01)

(52) U.S. Cl.
CPC ............. *B64D 27/24* (2013.01); *B64D 41/00* (2013.01); *B64C 2201/024* (2013.01); *B64C 2201/042* (2013.01); *B64C 2201/044* (2013.01); *B64C 2201/066* (2013.01); *B64D 2027/026* (2013.01); *Y02T 50/62* (2013.01)

(58) Field of Classification Search
CPC ....... B64C 39/024; B64C 39/02; B64C 27/08; B64D 27/24; B64D 27/04; B64D 41/00
USPC .......................................................... 244/58
See application file for complete search history.

(56) References Cited

U.S. PATENT DOCUMENTS

| | | | | |
|---|---|---|---|---|
| 9,194,285 | B2* | 11/2015 | Botti | B64D 27/24 |
| 9,242,728 | B2* | 1/2016 | Morrison | B64C 27/08 |
| 9,434,267 | B2* | 9/2016 | Wang | B60L 11/1822 |
| 9,446,842 | B2* | 9/2016 | Luyks | B64C 27/12 |
| 9,561,860 | B2* | 2/2017 | Knapp | B64C 11/001 |
| 9,643,729 | B2* | 5/2017 | Walter-Robinson | B64D 41/00 |
| 9,663,237 | B2* | 5/2017 | Senkel | B64D 17/80 |
| 9,764,837 | B2* | 9/2017 | Phan | B64D 27/02 |
| 10,301,011 | B2* | 5/2019 | Strauss | B64D 35/00 |
| 2008/0184906 | A1 | 8/2008 | Kejha | |
| 2009/0145998 | A1 | 6/2009 | Salyer | |
| 2012/0025012 | A1 | 2/2012 | Arlton et al. | |
| 2013/0147204 | A1 | 6/2013 | Botti et al. | |
| 2015/0012154 | A1 | 1/2015 | Senkel et al. | |
| 2017/0066539 | A1* | 3/2017 | van der Westhuizen | B64D 27/24 |
| 2017/0313433 | A1* | 11/2017 | Ozaki | B64C 27/08 |

FOREIGN PATENT DOCUMENTS

| | | |
|---|---|---|
| CN | 103359284 A | 10/2013 |
| CN | 103580280 A | 2/2014 |
| CN | 203491696 U | 3/2014 |
| CN | 103802687 A | 5/2014 |
| CN | 103986202 A | 8/2014 |
| JP | H 08-150818 A | 6/1996 |
| JP | 2010-120641 A | 6/2010 |
| JP | 2011-240745 A | 12/2011 |
| JP | 2013-147233 A | 8/2013 |
| JP | 2014-117066 A | 6/2014 |

OTHER PUBLICATIONS

International Search Report of PCT/JP2015/003403, dated Sep. 18, 2015, 4 pages.
Office Action dated Nov. 2, 2018 to corresponding Chinese Patent Application No. 201580056669.5, citing the arts listed above.
Office Action dated Jun. 27, 2019 to corresponding Chinese Patent Application No. 201580056669.5, citing the arts listed above.

* cited by examiner

HELICOPTER

TECHNICAL FIELD

The present invention relates to a helicopter, and particularly relates to the helicopter having two or more rotors (rotary wings).

BACKGROUND ART

A helicopter for ascending or flying, in which a lifting power is generated by rapidly rotating the rotors that are provided at an upper portion of a bodywork of the helicopter, has been conventionally known. The helicopter that is equipped with two or more rotors is called as a multicopter. Patent Document 1 discloses this type of helicopter.

The multicopter of Patent Document 1 has two rotors, a coaxial contrarotating system for rotating the two rotors in the directions opposite to each other, a shaft that transmits the engine rotation to the coaxial contrarotating system and the rotors, an auxiliary propeller, a vertical tail, a horizontal tail, wheels that are driven by an electric motor, a generator and a battery that supply the electric power with a motor for a main rotor in emergency, a motor for the auxiliary propeller, the motor for the wheels, an engine that drives the main rotor and the generator, and a gearbox. Each of pitch angles of blades in the rotors is constant at all azimuth angles. The auxiliary propeller generates thrust in a front-back, left-right, and up-down directions.

The configuration of Patent Document 1 can achieve a simple configuration of a hinge of the helicopter, less failure rate, and safe flying.

Patent Document 2 discloses a rotary wing vehicle which is used as an unmanned aerial vehicle (UAV), and which flies by using rotary wings in the same way as the helicopter. The rotary wing vehicle has a main body structure having an elongated tubular spine or core, a first rotor system, a second rotor system, and a booster module. An electric power transmission to the rotor systems and between the two rotor systems is performed not by mechanical axis transmission, but mainly by electrical wiring. In the rotary wing vehicle, weight of the UAV can be reduced by falling off the booster module.

The configuration of Patent Document 2 can achieve an easy manufacturing. Moreover, weight of the UAV is reduced by falling off the booster module, which can achieve a continued flying in a second flying phase.

Non-Patent Document 1 discloses the above-described multicopter. In the multicopter of Non-Patent Document 1, the multicopter is driven with a hybrid of the engine and the motor, and thereby the engine works as a main power to concurrently generate thrust and power. The configuration of Non-Patent Document 1 can achieve a long-time continuous navigation.

PRIOR-ART DOCUMENTS

Patent Documents

PATENT DOCUMENT 1: Japanese Patent Application Laid-Open No. 1996-150818
PATENT DOCUMENT 2: Japanese Patent Application Laid-Open No. 2010-120641

Non-Patent Documents

NON-PATENT DOCUMENT 1: "Multicopter evolutionary theory", radio control technology, Radio Experiment Co., Ltd., Apr. 10, 2014, P. 35

SUMMARY OF THE INVENTION

Problems to be Solved by the Invention

However, since Patent Document 1 discloses a configuration that a main rotor is driven by an engine, it may be impossible to fly at a time when the engine has abnormality. Additionally, it is difficult to suppress noise and exhaust caused by the engine.

Patent Document 2 is configured to fly in two phases. That is, when a first flying phase is finished, a power source in the first flying phase is fallen off and weight of the UAV is reduced, and then flying is continued in a second flying phase. However, a configuration that the power source is thrown every flying increases costs considerably.

Although Non-Patent Document 1 is configured to be driven with the hybrid of the engine and the motor. However, the engine always needs to continue to be operated since the engine is used for generating thrust. Therefore, similarly to the configuration of Patent Document 1, it is impossible to fly at a time when the engine has abnormality.

The present invention is made under the circumstances described above, and an object of the present invention is to provide a helicopter which can achieve a long-time flight that is driven by a battery as a main power source.

Means for Solving the Problems and Effects Thereof

The problem to be solved by the present invention is as described above. Next, means for solving the problem and effects thereof will be described.

In an aspect of the present invention, a helicopter having the following configuration is provided. The helicopter has a plurality of rotors, electric motors, at least one main battery, a generator, and an engine. The electric motor drives the rotors. The main battery is a first electric power source that supplies the electric power with the electric motors. The engine drives the generator. The generator is a second electric power source that supplies the electric power with the electric motors. When a remaining capacity of the main battery is less than a threshold, the generator charges the main battery with the electric power that has been converted from motive power from the engine.

Accordingly, the battery drives the electric motors, which can reduce noise. Moreover, charging can be performed by operation of the engine when the remaining capacity of the battery is less than the threshold, which can achieve a long-time flight of the helicopter.

The helicopter is preferably configured as follows. That is, the helicopter includes the plurality of batteries. The one of the plurality of batteries drives the electric motors. When the remaining capacity of the battery is less than the threshold, the other battery that is switched from the existing battery drives the electric motors. The generator charges the battery in which the remaining capacity is less than the threshold, by the electric power that has been converted from motive power from the engine.

Accordingly, when the remaining capacity of the battery is less than the threshold, the battery is switched to the other battery and then the other battery can drive the electric motors. Additionally, the battery in which the remaining capacity is less than the threshold can be charged by operating the engine. That is, one battery drives the electric motors concurrently with charging of other battery by operation of the engine. This can always secure one or more batteries having a state in which charging is substantially to full. Therefore, since the electric motors can be surely driven over a long time while switching among the plurality of batteries, the flight time can be effectively extended.

In the helicopter, it is preferable that operation of the engine is stopped after charging of the main battery in which the remaining capacity is less than the threshold is completed.

Accordingly, fuel can be saved by operating the engine only when necessary. Moreover, generation of noise and exhaust caused by operation of the engine can be successfully suppressed.

In the helicopter, it is preferable that, when the helicopter ascends, the generator is configured to supply the electric power that has been converted from motive power from the engine, directly to the electric motors.

When the helicopter ascends, the engine drives the generator and supplies the electric power directly to the electric motors, which can powerfully drive the electric motors and can rapidly rotate the rotors. This enables the helicopter to ascend preferably.

The helicopter is preferably configured as follows. That is, when the remaining capacity of the one battery that drives the electric motors is less than the threshold, the battery is switched to other battery to drive the electric motors, thereby an auxiliary remaining capacity remains in the battery. The electric power that remain in the battery can be supplied for emergency safe landing.

Accordingly, since a state in which the predetermined auxiliary remaining capacity remains in the battery can be kept, safe landing of the helicopter can be secured with the electric power that remains in the battery even if abnormal situation such as failure of the other battery, the rotors, the electric motors, the engine or the like is occurred.

The helicopter is preferably configured as follows. That is, the helicopter includes an auxiliary battery separately from the battery that drives the electric motors. The auxiliary battery is used for safe landing in abnormal situation.

Accordingly, since an electric power source for safe landing in a case that abnormal situation is occurred in the helicopter is provided, safe landing of the helicopter in abnormal situation can be secured even if the main battery is wholly failed.

In the helicopter, it is preferable that the auxiliary battery can be charged by the generator.

Accordingly, the auxiliary battery can be easily charged without requiring further charging device.

EMBODIMENT FOR CARRYING OUT THE INVENTION

Figure 1:
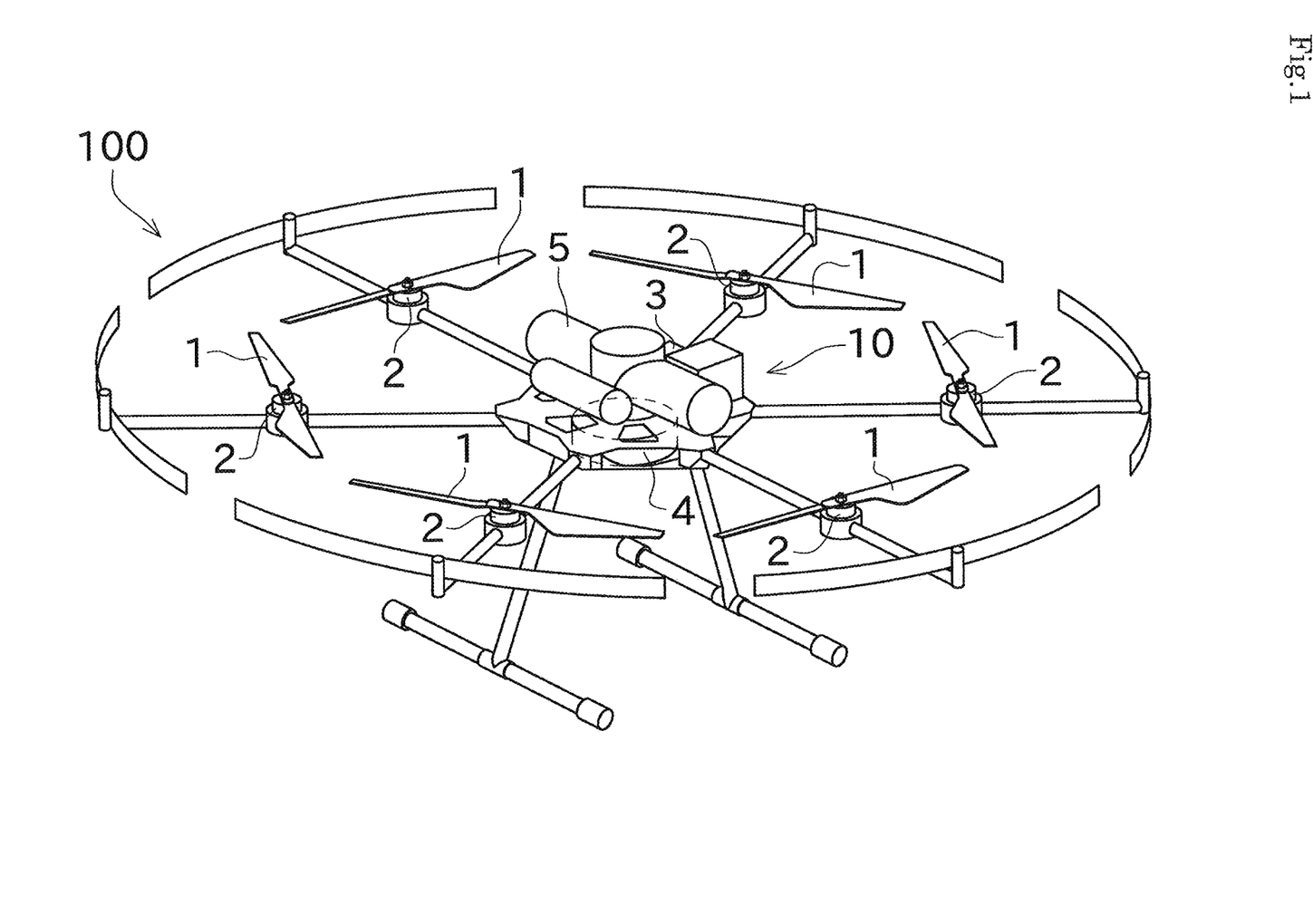
FIG. 1 A perspective view showing an overall configuration of a multicopter according to a first embodiment of the present invention.

Next, some embodiments of the present invention will be described with reference to the drawings. FIG. 1 is a perspective view showing an overall configuration of a multicopter 100.

The multicopter (helicopter) 100 shown in FIG. 1 is configured as an unmanned multicopter that is equipped with a plurality of propellers (rotors) 1 (in this embodiment, six propellers). The multicopter 100 can be operated by remote control. As shown in FIG. 1, the multicopter 100 includes a bodywork 10, six propellers 1, electric motors 2, a main battery (battery) 3, a generator 4, and an engine 5.

The bodywork 10 is arranged in a central portion of the multicopter 100. The electric motors 2, main batteries 3, the generator 4, and the engine 5 are installed in the bodywork 10.

As shown in FIG. 1, the propellers 1 are arranged on a circle centered at the bodywork 10 at regular intervals. The multicopter 100 flies by simultaneously rotating each of the propellers 1.

The electric motors 2 that are arranged below each of the propellers 1 drive the propellers 1. Each of the electric motors 2 is electrically connected to the main batteries 3. The main batteries 3 supply the electric power with each of the electric motors 2.

The generator 4 is a second electric power source of the multicopter 100. The generator 4 configured to charge the main battery 3 is installed in a lower portion of the bodywork 10.

The engine 5 is a power source of the generator 4. A small diesel engine or a reciprocating engine can be used as the engine 5.

In the above-described configuration, the multicopter 100 of this embodiment supplies the electric power of the main battery 3 to the electric motors 2 and flies by rotating the six propellers 1.

Figure 2:
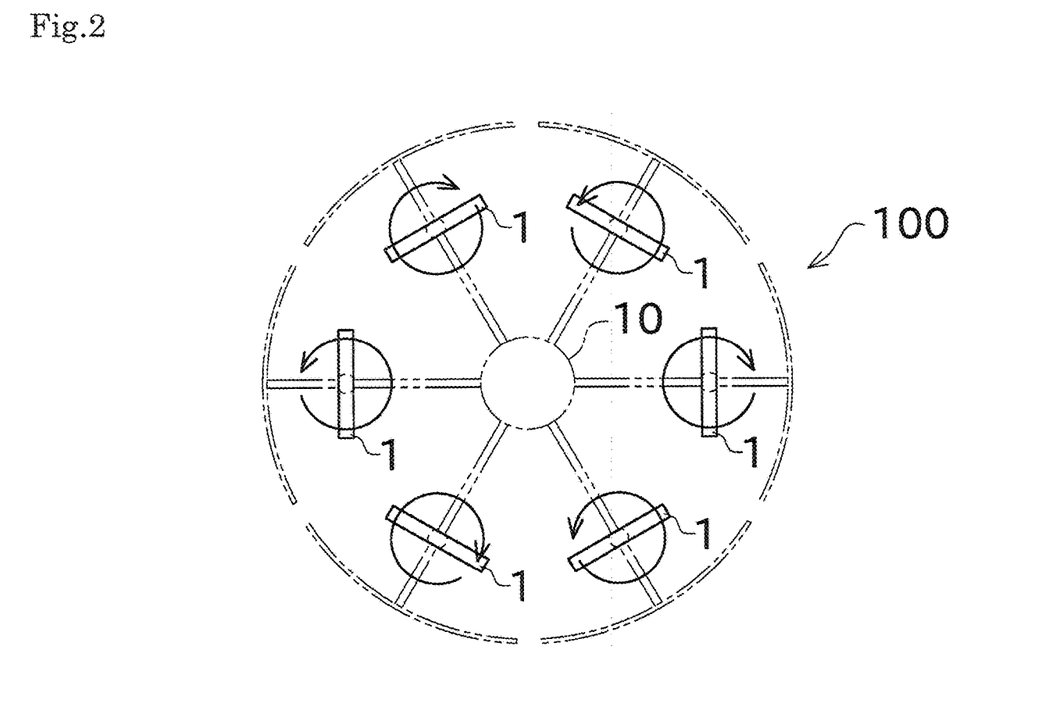
FIG. 2 A schematic plan view showing rotation of propellers in the multicopter.

Although the principle of flight of the multicopter 100 has been known, in the following, flight of the multicopter 100 will be briefly described with reference to FIG. 2. FIG. 2 is a schematic plan view showing rotation of each of the propellers 1 in the multicopter 100.

As shown in FIG. 2, rotational directions of the six propellers 1 included in the multicopter 100 is set to reverse the rotational directions between the adjacent propellers 1 in a circumferential direction. Accordingly, since rotation torques that are generated by rotation of the propellers 1 are offset to each other, the multicopter 100 can preferably ascend by obtaining a climbing power without turning due to rotation of the propellers 1.

Hovering or level flight of the multicopter 100 can be achieved by controlling a rotation speed of the each of the propellers 1 and balancing between a lifting power that is obtained by rotation of the propellers 1 and gravity of the multicopter 100. The multicopter 100 can descend by decreasing the lifting power that is generated by the propellers 1.

Turning of the multicopter 100 can be achieved by controlling the rotation speed of each of the propellers 1 and causing imbalance in rotation torques that are generated by rotation of the six propellers 1.

In the multicopter having the above-described configuration, since the plurality of propellers needs to be rotated simultaneously, a high electric power is consumed. Accordingly, in order to achieve a long-time flight in the multicopter having a single electric power source (a battery, or an engine and a generator), the number of batteries mounted as an electric power source has been conventionally increased or the amount of fuel of the engine used as a power source of the generator has been conventionally increased. However, when the mounting number of batteries or the amount of fuel are increased, which leads to increasing in cost, it will be more difficult to downsizing and weight reduction of the bodywork of the multicopter, and it will lead to further increasing in power consumption for flight. For this reason, it is difficult to achieve a long-time flight in the multicopter. Moreover, when the multicopter flies by operating the engine, an environmental effect of noise and exhaust caused by the engine is significant.

In this respect, the multicopter 100 of this embodiment is configured to use batteries as a main electric power source. The multicopter 100 includes at least two main batteries 3, the generator 4, and the engine 5. Accordingly, while one main battery 3 makes the multicopter 100 to fly, the propellers 1 can be rotated by switching to the other main battery 3 when the remaining capacity of the one main battery 3 is decreased. The main battery 3 having less remaining capacity can be charged by the generator 4 driven by the engine 5.

Figure 3:
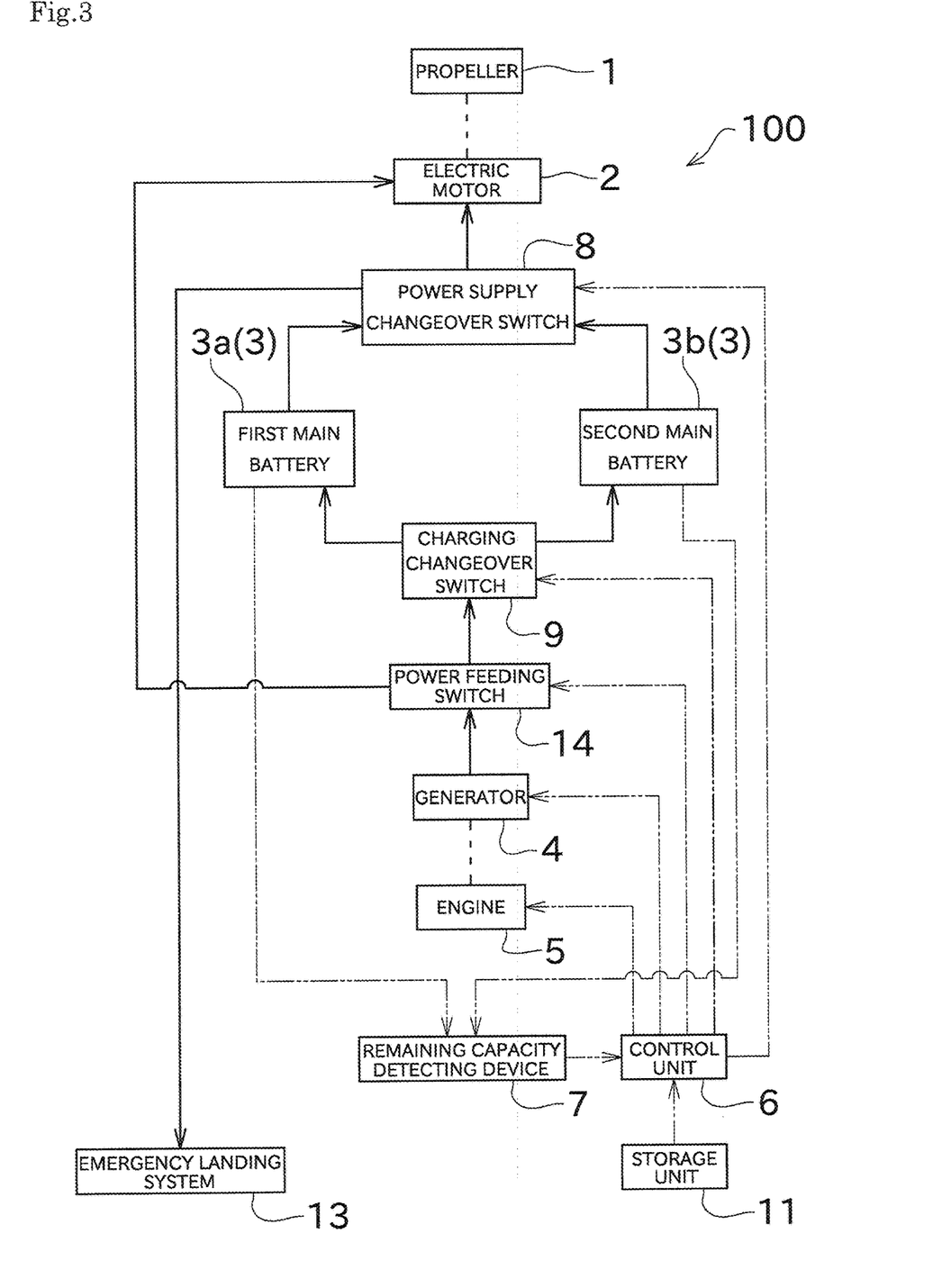
FIG. 3 A block diagram showing an outline of a configuration of the multicopter.

In the following, an electrical configuration of the multicopter 100 of this embodiment will be described with reference to FIG. 3. FIG. 3 is a block diagram showing an outline of a configuration of the multicopter 100.

As shown in FIG. 3, the multicopter 100 includes a first main battery 3a, a second main battery 3b, a control unit 6, a remaining capacity detecting device 7, an electric power supply changeover switch 8, a charging changeover switch 9, a power feeding switch 14, and a storage unit 11.

The first main battery 3a and the second main battery 3b are electrically connected to the electric motors 2 respectively via the electric power supply changeover switch 8 so as to supply the electric power to the electric motors 2. Two main batteries 3a, 3b that are electrically connected to the generator 4 via the charging changeover switch 9 can be charged by the generator 4.

The control unit 6 is configured as a small computer. The control unit 6 can transmit command to the electric power supply changeover switch 8 based on the remaining capacity of the main batteries 3 that are detected by the remaining capacity detecting device 7, and is capable of switching between the main batteries 3 that supply the electric power to the electric motors 2. The control unit 6 can charge the main batteries 3 with the electric power that is generated by the generator 4 by operation of the engine 5.

The charging changeover switch 9 can supply the electric power from the generator 4 to the main battery 3a or the second battery 3b in accordance with the command of the control unit 6.

The power feeding switch 14 can switch between situation that the electric power from the generator 4 is supplied to the charging changeover switch 9, and situation that the electric power from the generator 4 is supplied directly to the electric motors 2.

The storage unit 11 stores various setting values (threshold values) and the like which are preset with respect to the remaining capacity of the main battery 3.

In the multicopter 100 of this embodiment, the electric power is supplied to the electric motors 2 as a driving source of the propellers 1 by using the first main battery 3a firstly. Then, when the remaining capacity detecting device 7 detects a situation that the remaining capacity of the first main battery 3a is little, the control unit 6 switches a supply source for supplying the electric power to the electric motors 2 from the first main battery 3a to the second main battery 3b. The control unit 6 controls such that the generator 4 is driven by operation of the engine 5, and the first main battery 3a is charged by the electric power that is generated by the generator 4. The charging is continued until the first main battery 3a is fully charged. When the first main battery 3a is fully charged, the engine 5 is stopped.

When the remaining capacity detecting device 7 detects a situation that the remaining capacity of the second main battery 3b is little, the control unit 6 switches the supply source for supplying the electric power to the electric motors 2 from the second main battery 3b to the first main battery 3a having full charge. The control unit 6 controls such that the generator 4 is driven by operation of the engine 5, and then the second main battery 3b is charged by the electric power that is generated by the generator 4. The charging is continued until the second main battery 3b is fully charged. When the second main battery 3b is fully charged, the engine 5 is stopped.

As such, in the multicopter 100 of this embodiment, since the electric power can be supplied to the electric motors 2 while switching between two main batteries 3a, 3b alternately, a long-time flight can be achieved.

Figure 4:
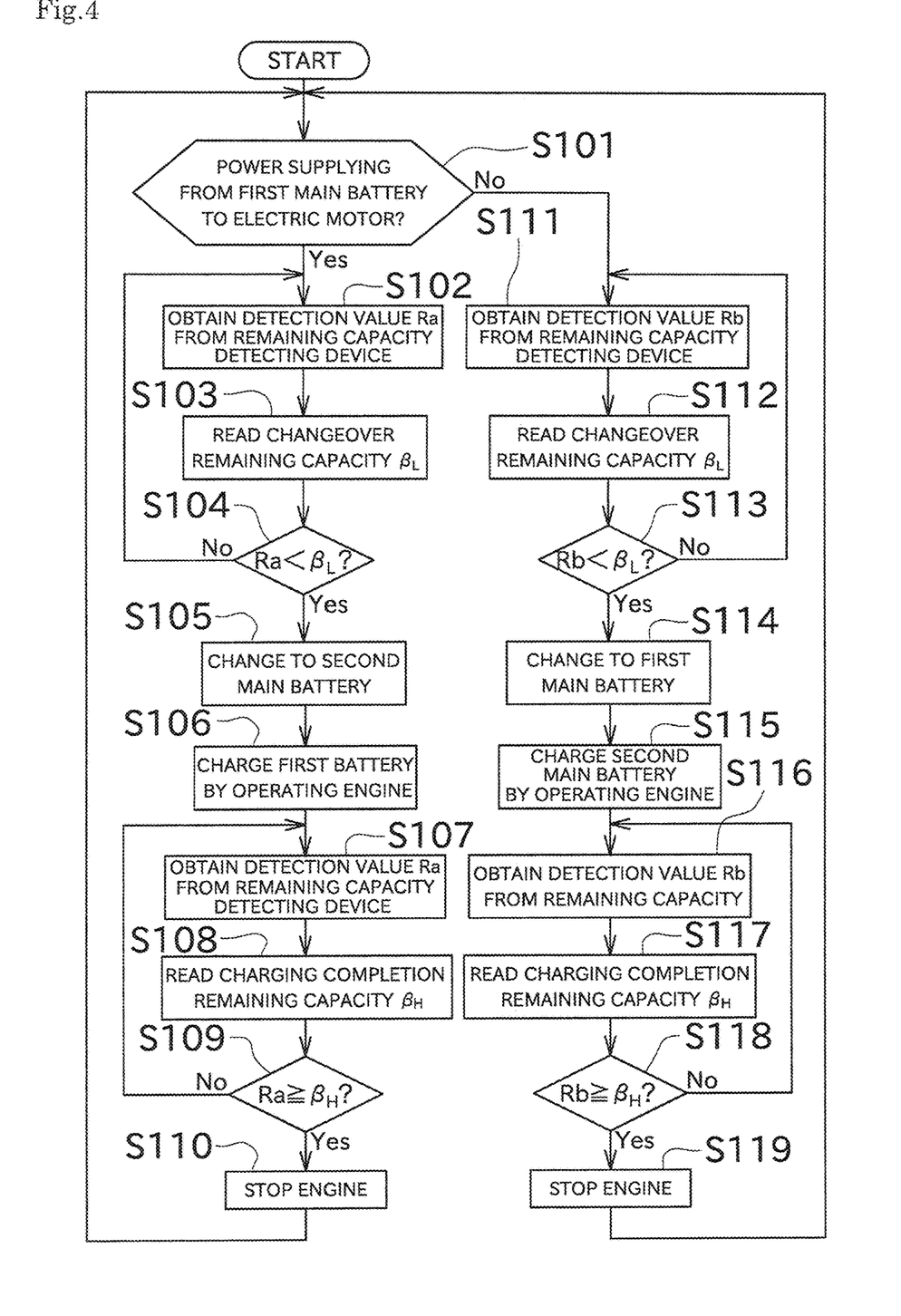
FIG. 4 A flowchart showing an example of control in which the electric power is supplied while switching between two main batteries.

Next, the control performed by the control unit 6 for supplying the electric power to the electric motors 2 while switching two main batteries 3, will be described with reference to FIG. 4. FIG. 4 is a flowchart showing an example of the control in which the electric power is supplied while switching between two main batteries 3.

When a flow shown in FIG. 4 is started, the control unit 6 is firstly determines whether or not the main battery 3 that presently supplies the electric power to the electric motors 2 is the first main battery 3a (step S101). When the first main battery 3a supplies the electric power to the electric motors 2, the control unit 6 obtains a remaining capacity detection value Ra of the first main battery 3a that is inputted from the remaining capacity detecting device 7 (step S102), and reads a threshold (a changeover remaining capacity) $\beta_L$ as a predetermined value that is preset with respect to the remaining capacity of the main battery 3 from the storage unit 11 (step S103). The control unit 6 compares the two obtained values (step S104). When the remaining capacity detection value Ra of the first main battery 3a is equal to or above the changeover remaining capacity $\beta_L$, the step is returned to the step S102.

In the determination of the step S104, when the remaining capacity detection value Ra of the first main battery 3a is less than the changeover remaining capacity $\beta_L$, the control unit 6 controls so as to switch the electric power supply source to the electric motors 2, from the first main battery 3a to the second main battery 3b (step S105). The control unit 6 controls the engine 5 to operate such that the power is generated by the generator 4, and thereby the first main battery 3a is charged (step S106). Accordingly, the second main battery 3*b* supplies the electric power to the electric motors 2 while charging the first main battery 3*a* so as to prepare for subsequently taking over as the electric power source of the electric motors 2.

Then, the control unit 6 obtains the remaining capacity detection value Ra of the first main battery 3*a* from the remaining capacity detecting device 7 (step S107), and reads a predetermined value (a charging completion remaining capacity) $\beta_H$ that is preset with respect to the remaining capacity of the main battery 3, from the storage unit 11 (step S108). Then, the control unit 6 compares the two obtained values (step S109). The charging completion remaining capacity $\beta_H$ is set to the remaining capacity that is equivalent to a remaining capacity of a substantially full charge state of the main battery 3. When the remaining capacity Ra of the first main battery 3*a* is less than the charging completion remaining capacity $\beta_H$, the step is returned to the step S106. When the remaining capacity Ra of the first main battery 3*a* is above the charging completion remaining capacity $\beta_H$, charging is finished by stopping operation of the engine 5, and then the step is returned to the step S101 again. Accordingly, since operation of the engine 5 can be limited to only a time of charging of the main batteries 3, noise and exhaust caused by operation of the engine 5 can be effectively suppressed.

In the step S101 of FIG. 4, when it is determined that the first main battery 3*a* does not supply the electric power to the electric motors 2, the control unit 6 obtains the remaining capacity detection value Rb of the second main battery 3*b* that is inputted from the remaining capacity detecting device 7 (step S111) and reads the above-described changeover remaining capacity $\beta_L$ (step S112). The control unit 6 compares the two obtained values (step S113). When the remaining capacity detection value Rb of the second main battery 3*b* is equal to or above the changeover remaining capacity $\beta_L$, the step is returned to the step S111.

In the determination of the step S113, when the remaining capacity detection value Rb of the second main battery 3*b* is less than the changeover remaining capacity $\beta_L$, the control unit 6 controls to switch the electric power supply source to the electric motors 2, from the second main battery 3*b* to the first main battery 3*a* (step S114). The control unit 6 controls the engine 5 to operate such that the power is generated by the generator 4, and thereby the second main battery 3*b* is charged (step S115).

Then, the control unit 6 obtains the remaining capacity detection value Rb of the second main battery 3*b* from the remaining capacity detecting device 7 (step S116), and reads the above-described charging completion remaining capacity $\beta_H$ (step S117). Then, the control unit 6 compares the two obtained values (step S118). When the remaining capacity Rb of the second main battery 3*b* is less than the charging completion remaining capacity $\beta_H$, the step is returned to the step S116. When the remaining capacity Rb of the second main battery 3*b* is above the charging completion remaining capacity $\beta_H$, charging is finished by stopping operation of the engine 5, and then the step is returned to the step S101 again.

Figure 5:
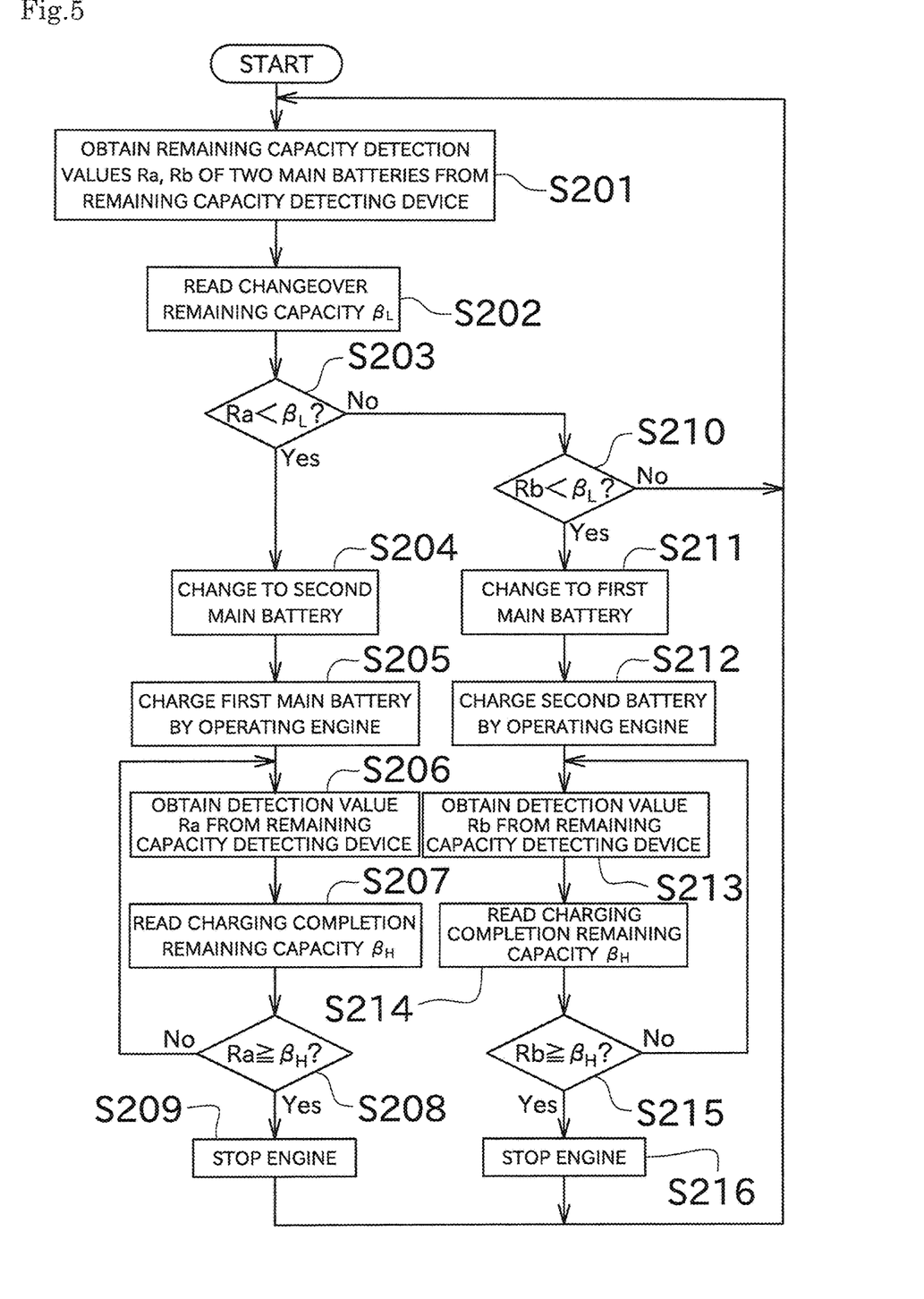
FIG. 5 A flowchart showing another example in which the electric power is supplied while switching between two main batteries.

However, the control unit 6 can be configured to perform the control shown in FIG. 5. In the following, the control of other example shown in FIG. 5 will be described.

When the flow of FIG. 5 is started, the control unit 6 obtains the remaining capacity detection value Ra of the first main battery 3*a* and the remaining capacity detection value Rb of the second main battery 3*b* (step S201), and reads the above-described changeover remaining capacity $\beta_L$ (step S202). Then, the control unit 6 compares the obtained remaining capacity Ra of the first main battery 3*a* with the changeover remaining capacity $\beta_L$ (step S203).

In the determination of the step S203, when the remaining capacity detection value Ra of the first main battery 3*a* is less than the changeover remaining capacity $\beta_L$, the control unit 6 controls to switch the electric power supply source to the electric motors 2, from the first main battery 3*a* to the second main battery 3*b* (step S204). The description of the subsequent steps (S205 to S209) will be omitted since they are similar to that of S106 to S110 in FIG. 4.

In the determination of the step S203, when the remaining capacity detection value Ra of the first main battery 3*a* is above the changeover remaining capacity $\beta_L$, the control unit 6 compares the remaining capacity Rb of the second main battery 3*b* with the changeover remaining capacity $\beta_L$ (step S210).

In the determination of the step S210, when the remaining capacity detection value Rb is less than the changeover remaining capacity $\beta_L$, the control unit 6 controls to switch the electric power supply source to the electric motors 2, from the second main battery 3*b* to the first main battery 3*a* (step S211). The description of the subsequent steps (S212 to S216) will be omitted since they are similar to that of S115 to S119 in FIG. 4.

In the determination of the step S210, when the remaining capacity detection value Rb of the second main battery 3*b* is equal to or above the changeover remaining capacity $\beta_L$, the step is returned to the step S201.

In the control shown in FIG. 5, although the step (step S101) for determining the electric power supply source that is performed in FIG. 4 is omitted, the control substantially similarly to the control of FIG. 4 can be achieved. However, this is not limited to the above-described two control flows as examples. The other controls may be adopted.

Next, the control of the power feeding switch 14 will be described. The power feeding switch 14 is for electrically connecting the generator 4 directly to the electric motors 2 as necessary. That is, since a high power is needed for the multicopter at a time of takeoff or ascending, in the multicopter 100 of this embodiment, the electric power that is generated by the generator 4 by operation of the engine can be supplied directly to the electric motors 2 so as to powerfully rotate the propellers 1 at a time of takeoff and ascending, while using the main battery 3 as a main electric power source.

Figure 6:
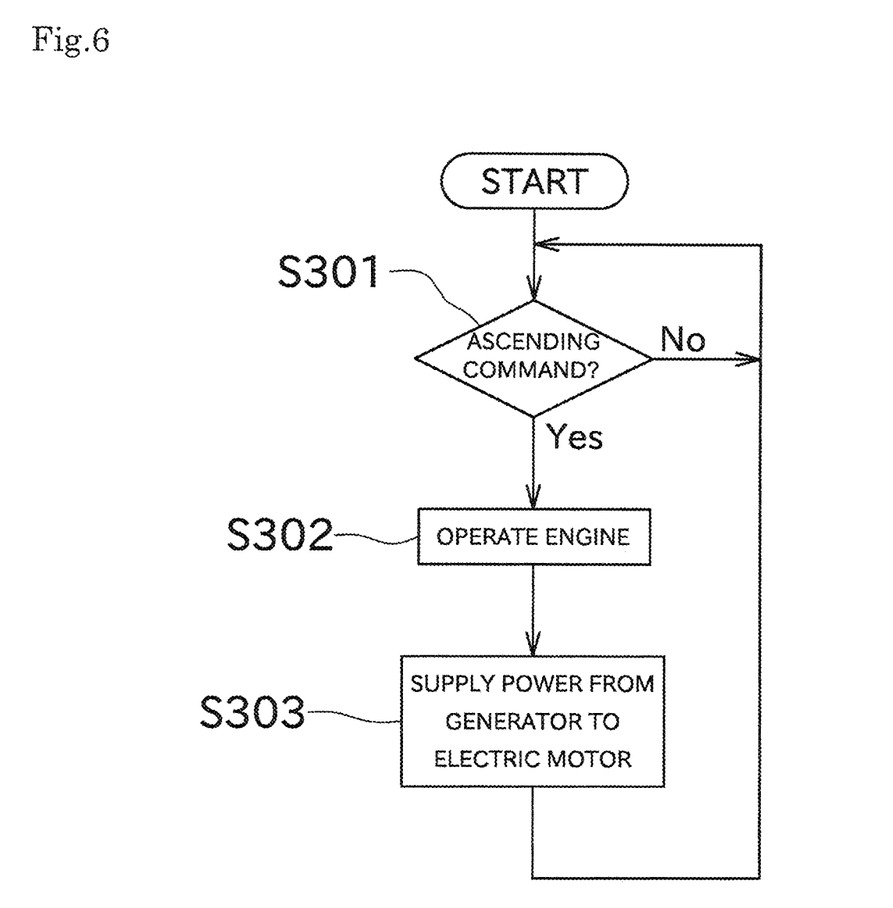
FIG. 6 A flowchart of control in which the electric power is supplied by a generator when the multicopter ascends.

Specifically, as shown in FIG. 6, when the control unit 6 receives the command to ascend the multicopter 100 (step S301), the control unit 6 makes the engine 5 to operate by transmitting an operation signal of the engine 5 (step S302). Then, the control unit 6 transmits a switching signal to the power feeding switch 14 and supplies the electric power that has been converted from motive power from the engine 5 by the generator 4, instead of the electric power from the main battery 3, to the electric motors 2 (step S303).

Accordingly, in the multicopter 100 of this embodiment, since the electric power can be supplied directly to the electric motors 2 by the generator 4 driven by the engine 5, the propellers 1 are rapidly rotated by powerfully driving of the electric motors 2, which can obtain a more powerful climbing power. This enables the helicopter to ascend preferably. Since the electric power of the main batteries 3 can be saved, a longer-time flight can be achieved.

Next, in the multicopter 100 of this embodiment, the emergency landing when abnormality is occurred will be described.

As shown in FIG. 3, the multicopter 100 of this embodiment includes an emergency landing system 13. The emergency landing system 13 is configured from a parachute (not shown) and the like. In this configuration, when abnormality such as failure of the propellers 1, failure of the electric motors 2, or a power feeding failure of the main batteries 3 is occurred, the emergency landing system 13 opens the parachute and thereby ensures safe landing of the multicopter 100.

The multicopter 100 of this embodiment is configured that the main battery 3 supplies the electric power to the emergency landing system 13. To be specific, as shown in FIG. 3, the emergency landing system 13 is connected to the electric power supply changeover switch 8. The electric power supply changeover switch 8 can be switched so that the electric power of the main battery 3 is supplied to the emergency landing system 13, according to the command from the control unit 6.

In the multicopter 100 of this embodiment, the above-described changeover remaining capacity $\beta_L$ is set to exceed the remaining capacity necessary for safe landing by the emergency landing system 13. Therefore, the auxiliary remaining capacity for driving the emergency landing system 13 in emergency can be always ensured in both of the first main battery 3a and the second main battery 3b.

Figure 7:
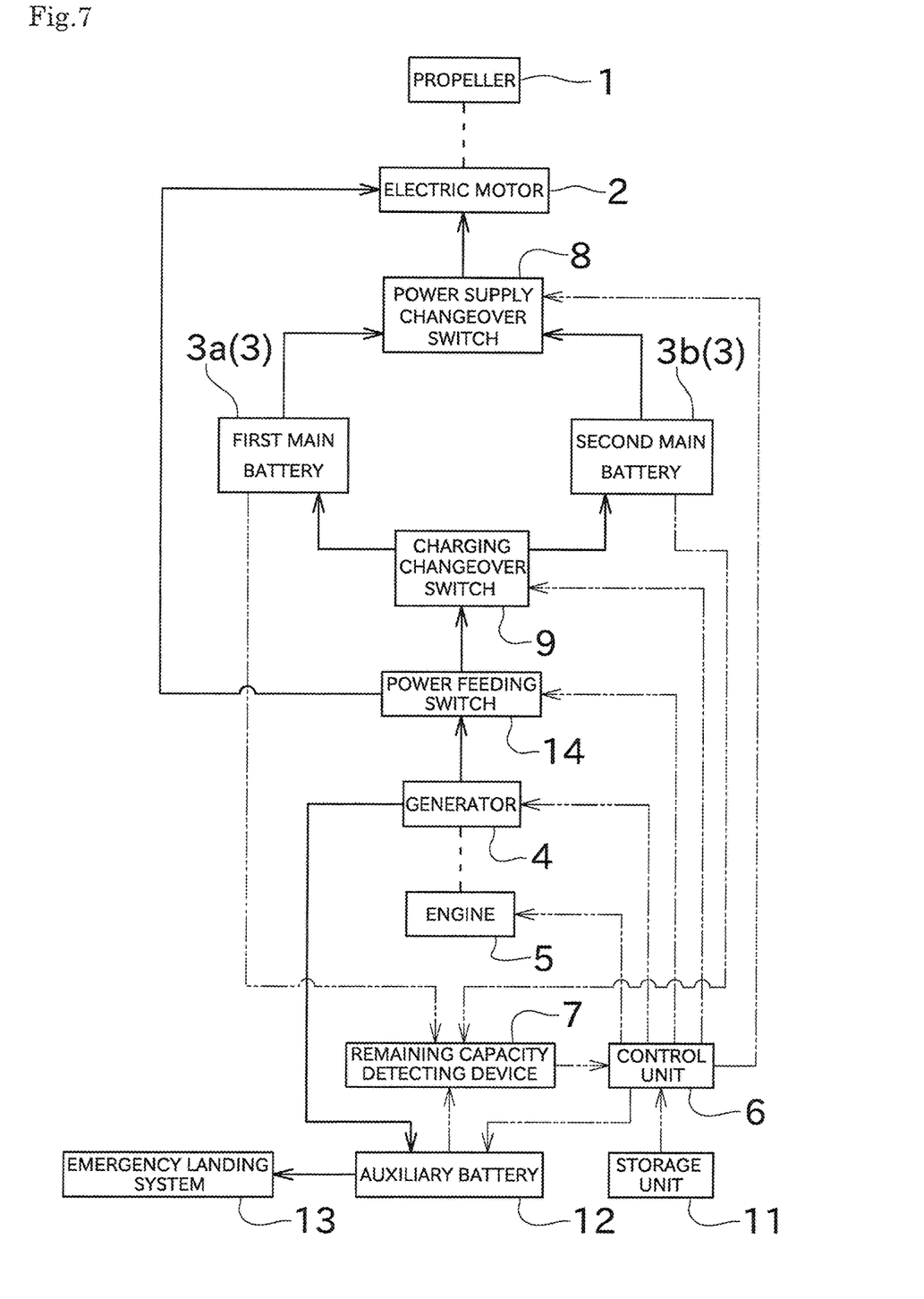
FIG. 7 A block diagram of the multicopter according to a modification of a first embodiment.

However, as shown in a modification of FIG. 7, an auxiliary battery 12 for driving the emergency landing system 13 can be provided separately from two main batteries 3. As shown in FIG. 7, the auxiliary battery 12 is connected to the emergency landing system 13 so as to supply the electric power to the emergency landing system 13. When abnormality is occurred, the electric power is supplied directly to the emergency landing system 13 in accordance with the command from the control unit 6. The auxiliary battery 12 is connected to the generator 4, and thereby the auxiliary battery 12 can be charged by the generator 4. In this configuration, the emergency landing system 13 can be surely driven in emergency.

As described above, the multicopter 100 of this embodiment having the plurality of propellers 1 includes the electric motors 2, at least one main battery 3, the generator 4, and the engine 5. The electric motors 2 drives the propellers 1. The main battery 3 is a first electric power source that supplies the electric power with the electric motors 2. The engine 5 drives the generator 4. The generator 4 is a second electric power source that supplies the electric power with the electric motors 2. The generator 4 charges the main battery 3 with the electric power that has been converted from motive power from the engine 5 when the remaining capacity of the main battery 3 is less than the changeover remaining capacity $\beta_L$.

Accordingly, the main battery 3 drives the electric motors 2, which can reduce noise. Additionally, charging can be performed by operation of the engine 5 when the remaining capacity of the main battery 3 is little. This can achieve a long-time flight of the multicopter 100.

The multicopter 100 of this embodiment includes a plurality of main batteries 3. One main battery 3 of the plurality of main batteries 3 drives the electric motors 2. When the remaining capacity of the main battery 3 is little, the other main battery 3 that is switched from the present main battery 3 drives the electric motors 2. The generator 4 charges the main battery 3 having the remaining capacity that is less than the changeover remaining capacity $\beta_L$, with the electric power that has been converted from motive power from the engine 5.

Accordingly, when the remaining capacity of the main battery 3 is decreased, the present main battery 3 is automatically switched to the other main battery 3, which can drive the electric motors 2. Additionally, the operation of the engine 5 can charge the main battery 3 having a decreased remaining capacity. That is, the other main battery 3 can be charged by operating the engine 5 while driving the electric motors 2 by the one main battery 3 simultaneously. This can always ensure one or more main battery 3 in substantially full charge. Therefore, since the electric motors 2 can be surely driven over a long time while switching the plurality of main batteries 3 therebetween, a flying time can be effectively extended.

In the multicopter 100 of this embodiment, operation of the engine 5 is stopped after charging of the main battery 3 in which the remaining capacity is little is completed.

Accordingly, the fuel can be saved by operating the engine 5 only when necessary. In addition, generation of noise and exhaust caused by operation of the engine 5 can be successfully suppressed.

In the multicopter 100 of this embodiment, when the multicopter 100 ascends, the generator 4 is configured that the electric power that has been converted from motive power from the engine 5 can be supplied directly to the electric motors 2.

Accordingly, when the multicopter 100 ascends, the electric power is supplied directly to the electric motors 2 by the generator 4 driven by the engine 5, which can achieve powerfully driving of the electric motors 2 and rapidly rotation of the propellers 1. This enables the multicopter 100 to ascend preferably.

In the multicopter 100 of this embodiment, when the remaining capacity of the main battery 3 that drives the electric motors 2 is less than the changeover remaining capacity $\beta_L$, the electric motors 2 are driven by the power from the other main battery 3 that is switched from the previous main battery 3. This can leave the auxiliary remaining capacity in the existing main battery 3. The electric power that remains in the main battery 3 can be supplied for emergency safe landing.

Accordingly, since a state in which the predetermined auxiliary remaining capacity remains in the main battery 3 can be kept, safe landing of the multicopter 100 can be secured with the electric power that remains in the main battery 3 even if abnormal situation such as failure of the other main battery 3, the propellers 1, the electric motors 2, the engine 5 or the like is occurred.

The multicopter of the modification shown in FIG. 7 includes the auxiliary battery 12 separately from the main batteries 3 that drive the electric motors 2. The auxiliary battery 12 is used for safe landing in abnormal situation.

Accordingly, since the electric power source dedicated to safe landing in a case that abnormal situation is occurred in the multicopter 100 is provided, safe landing of the multicopter 100 in abnormal situation can be secured even if the main batteries 3 are wholly failed.

In the multicopter of the modification shown in FIG. 7, the auxiliary battery 12 can be charged by the generator 4.

Accordingly, the auxiliary battery 12 can be easily charged without requiring further charging device.

Figure 8:
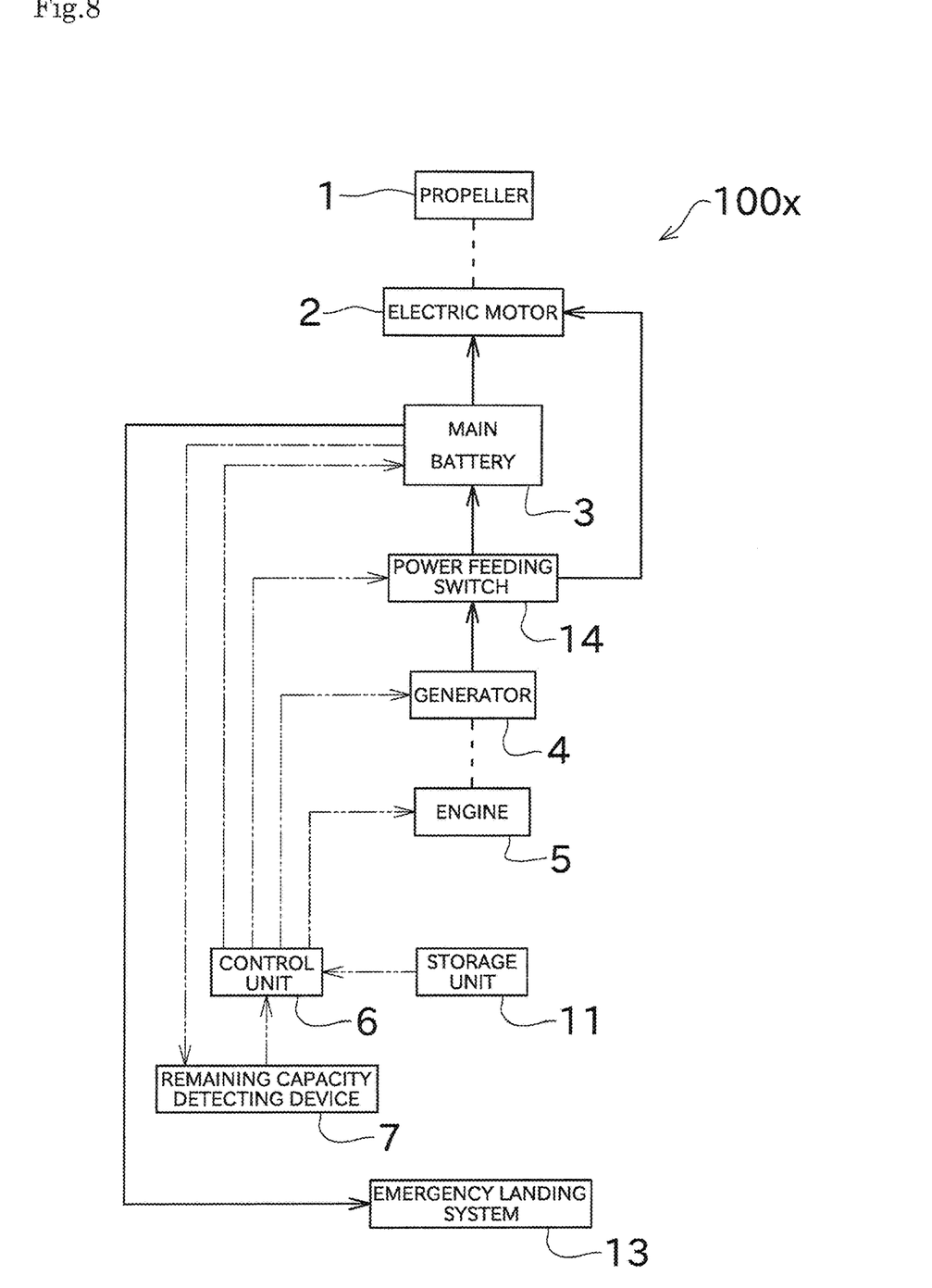
FIG. 8 A block diagram of the multicopter according to a second embodiment.

Next, a multicopter 100x of a second embodiment having one main battery 3 will be described with reference to FIG. 8 and FIG. 9. FIG. 8 is a block diagram of the multicopter 100x according to the second embodiment. In the description of this embodiment, members identical or similar to those of the above-described embodiment are given the same corresponding reference numerals on the drawings, and descriptions thereof may be omitted.

As shown in FIG. 8, one main battery 3 is equipped with the multicopter 100x of this embodiment. In this case, the main battery 3 is configured as a main power source that supplies the electric power with the electric motors 2. When the remaining capacity detecting device 7 detects that the remaining capacity of the main battery 3 is little, in the control unit 6, the generator 4 is driven by operation of the engine 5 and the main battery 3 is charged by the electric power that is generated by the generator 4. That is, when the remaining capacity of the main battery 3 is less than the predetermined capacity, the main battery 3 supplies the electric power to the electric motors 2 while charging with the electric power that has been converted from motive power from the engine 5 by the generator 4. The control unit 6 makes the engine 5 and the generator 4 to be stopped after charging of the main battery 3 is completed.

Figure 9:
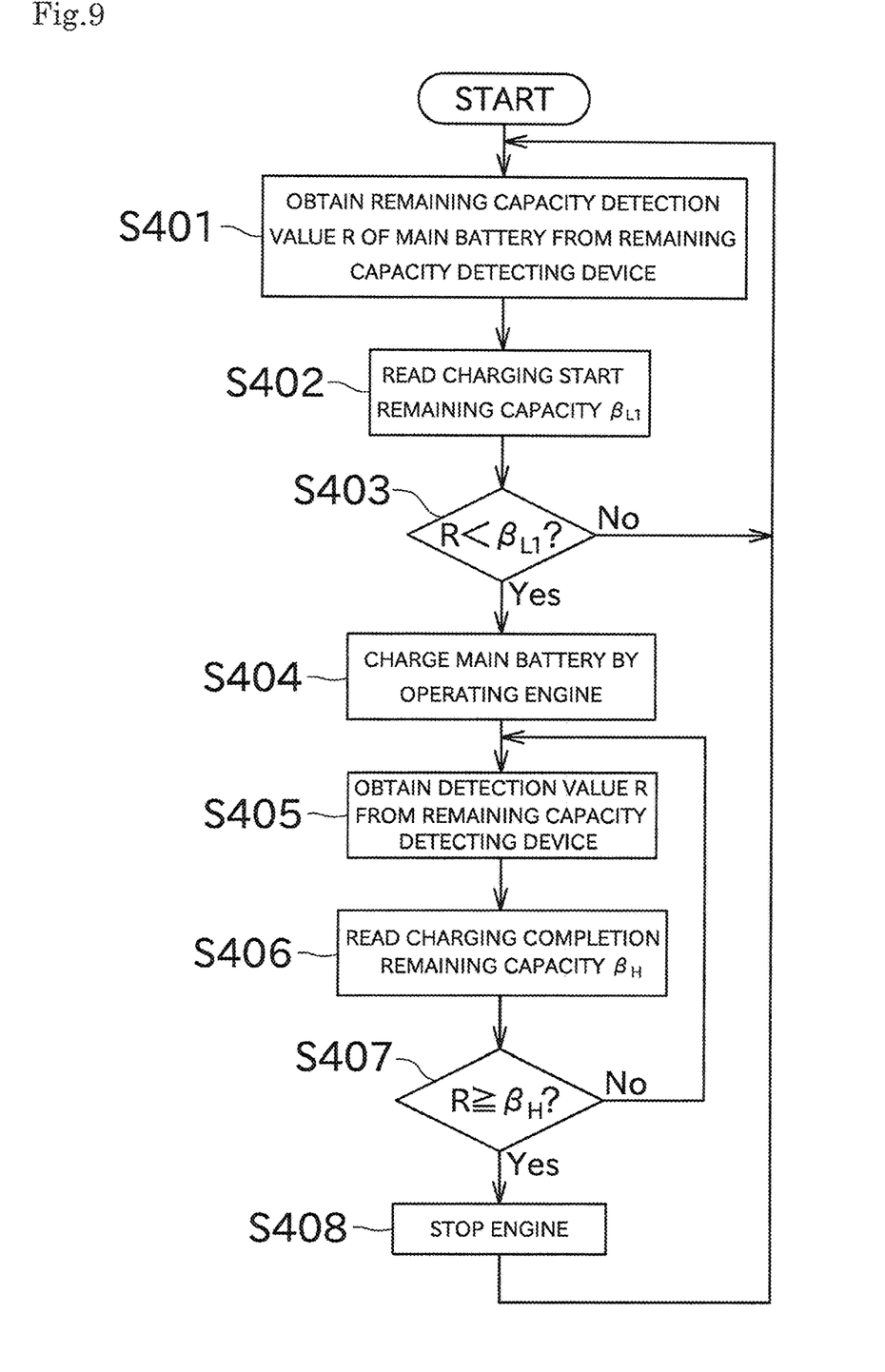
FIG. 9 A flowchart of control that is performed in a control unit with respect to charging of a main battery in the multicopter of the second embodiment.

FIG. 9 shows an example of control with respect to charging of the main battery 3 in the multicopter 100x of this embodiment. When a flow of FIG. 9 is started, the control unit 6 firstly obtains the remaining capacity detection value R of the main battery 3 from the remaining capacity detecting device 7 (step S401), and reads the predetermined value (charging start remaining capacity) $\beta_{L1}$ that is preset with respect to the remaining capacity of the main battery 3 (step S402). Then, the control unit 6 compares the obtained remaining capacity R of the main battery 3 with the charging start remaining capacity $\beta_{L1}$ (step S403). When the remaining capacity detection value R is above the charging start remaining capacity $\beta_{L1}$, the step is returned to the step S401.

In the determination of the step S403, when the remaining capacity R of the main battery 3 is less than the charging start remaining capacity $\beta_{L1}$, in the control unit 6, the main battery 3 is charged by the generator 4 driven by operation of the engine 5 (step S404).

After that, the control unit 6 obtains the remaining capacity detection value R of the main battery 3 from the remaining capacity detecting device 7 (step S405), reads the above-described charging completion remaining capacity $\beta_H$ from the storage unit 11 (step S406), and compares the two obtained values. When the remaining capacity R of the main battery 3 is less than the charging completion remaining capacity $\beta_H$, the step is returned to the step S405. When the remaining capacity R of the main battery 3 is above the charging completion remaining capacity $\beta_H$, the control unit 6 completes charging by stopping operation of the engine 5, and then returns to the step S401 again.

As such, in the multicopter 100x of this embodiment, since the main battery 3 as the electric power source of the electric motors 2 can be charged by using the engine 5 and the generator 4, a long-time flight can be achieved with a configuration having only one main battery 3. Since only one main battery 3 is provided, a configuration of the multicopter 100x can be simplified.

While some preferred embodiments of the present invention have been described above, the foregoing configurations may be modified, for example, as follows.

The number of the main batteries 3 is not limited to one or two as shown in the above-described embodiments. Three or more main batteries 3 may be adoptable.

In the multicopter 100 of the above-described first embodiment, the auxiliary remaining capacity of the power is maintained in the main batteries 3. The auxiliary battery 12 is provided in the multicopter of the modification (FIG. 7). However, the electric power may be supplied to the emergency landing system 13 with a configuration having the auxiliary battery 12 in addition to a configuration for securing the auxiliary remaining capacity in the main battery 3 and, by combining the above-described embodiment with the modification. Similarly, the auxiliary battery 12 similar to that of FIG. 7 may be provided in the multicopter 100x of the above-described second embodiment.

The number of propellers 1 is not limited to six, as shown in the above-described embodiments. Five or less, or seven or more propellers 1 may be adoptable.

DESCRIPTION OF THE REFERENCE NUMERALS 1 propeller (rotor)
2 electric motor
3 main battery (battery)
4 generator
5 engine
6 control unit
7 remaining capacity detecting device
8 electric power supply changeover switch
9 charging changeover switch
10 bodywork
11 storage unit
12 auxiliary battery
13 emergency landing system
14 power feeding switch
100 multicopter (helicopter)

The invention claimed is:

1. An electric helicopter comprising:
    a plurality of rotors;
    a plurality of motors coupled to and configured to drive the plurality of rotors;
    a plurality of batteries as a first electric power source, each battery of the plurality of batteries configured to supply electric power to the plurality of motors;
    a generator as a second electric power source configured to supply second electric power to the plurality of motors; and
    an engine coupled to and configured to drive the generator,
    wherein:
        the generator is configured to charge at least one battery of the plurality of batteries with the second electric power from the generator that has been converted from motive power from the engine while a remaining capacity of the at least one battery is less than a threshold;
        when a remaining capacity of a first battery of the plurality of batteries is less than the threshold, the electric helicopter is configured to switch to a second battery of the plurality of batteries to drive the plurality of motors; and
        after switching to the second battery, an auxiliary remaining capacity is available from the first battery and the first battery is configured to supply the auxiliary remaining capacity to the plurality of motors for landing in the event of an abnormality.

2. The electric helicopter according to claim 1, wherein:
    each motor of the plurality of motors is coupled to a corresponding rotor of the plurality of rotors;
    the plurality of motors is driven by the first battery; and
    while the remaining capacity of the first battery is less than the threshold:
        the second battery drives the plurality of motors, and
        the generator supplies the first battery with the second electric power from the generator that has been converted from motive power from the engine to charge the first battery.

3. The electric helicopter according to claim 2, wherein operation of the engine is stopped after charging of the first battery is completed, the charging of the first battery is completed responsive to a determination that the remaining capacity of the first battery is greater than a second threshold, the second threshold greater than the threshold.

4. The electric helicopter according to claim 1, wherein:
the generator is configured to supply the second electric power that has been converted from motive power from the engine directly to the plurality of motors while the electric helicopter ascends; and
each motor of the plurality of motors is coupled to a corresponding rotor of the plurality of rotors.

5. The electric helicopter according to claim 1, further comprising:
an auxiliary battery distinct from the plurality of batteries that drives the plurality of motors, the auxiliary battery configured to provide power for safe landing in an abnormal situation; and
wherein each motor of the plurality of motors is coupled to a corresponding rotor of the plurality of rotors.

6. The electric helicopter according to claim 5, wherein the auxiliary battery is configured to be charged by the generator.

7. The electric helicopter according to claim 1, further comprising:
a control unit configured to control an electric helicopter.

8. A control system for an electric helicopter of claim 1, the control system comprising:
a control unit configured to control an electric helicopter comprising a plurality of rotors, a plurality of motors coupled to and configured to drive the plurality of rotors, a first electric power source comprising a plurality of batteries configured to supply electric power to the plurality of motors, a second electric power source comprising a generator configured to supply second electric power to the plurality of motors, and an engine coupled to and configured to drive the generator; and
wherein to control the electric helicopter, the control unit is further configured to:
while a first battery of the plurality of batteries is used drive the plurality of motors, determine whether a remaining capacity of the first battery is less than a threshold;
based on a determination that the remaining capacity of the first battery is less than the threshold:
switch to a second battery of the plurality of batteries to drive the plurality of motors;
charge the first battery with the second electric power from the generator that has been converted from motive power from the engine; and
after switching to the second battery, enable an auxiliary remaining capacity available from the first battery to be supplied to the plurality of motors for landing in the event of an abnormality.

9. The control system according to claim 8, wherein:
each motor of the plurality of motors is coupled to a corresponding rotor of the plurality of rotors; and
while the plurality of motors is being driven by the first battery and while the remaining capacity of the first battery is less than the threshold:
the control unit is configured to:
switch the plurality of motors to be driven by a second battery of the plurality of batteries; and
cause the generator to charge the first battery with the second electric power from the generator that has been converted from motive power from the engine.

10. The control system according to claim 9, wherein the control unit is configured to stop operation of the engine responsive to a charge of the first battery exceeding a second threshold greater than the threshold.

11. The control system according to claim 9, wherein:
the electric helicopter further comprises an emergency landing system;
the threshold is set such that an auxiliary remaining capacity is available in the first battery after the control unit switches the plurality of motors to be driven by the second battery; and
the control unit is configured to supply the electric power of the auxiliary remaining capacity of the first battery to the emergency landing system responsive to an abnormal situation.

12. The control system according to claim 11, wherein:
the control unit is configured to cause the generator to supply the second electric power that has been converted from motive power from the engine directly to the plurality of motors responsive to an ascent command.

13. The control system according to claim 8, wherein:
the electric helicopter further comprises a third electric power source distinct and separate from the first and second electric power sources, the third electric power source configured to supply third electric power to the plurality of motors for safe landing in an abnormal situation;
the third electric power source comprises an auxiliary battery; and
the control unit is configured to charge the third electric power source with the second electric power that has been converted from motive power from the engine by the generator.

14. The control system according to claim 8, wherein:
each motor of the plurality of motors is coupled to a corresponding rotor of the plurality of rotors;
the electric helicopter comprises an electric multicopter; and
the plurality of motors corresponds to a primary power plant of the electric multicopter.

15. The control system according to claim 8, wherein:
control unit is configured to operate the electric helicopter in multiple modes;
the generator is not operational in a first mode of the multiple modes, wherein the first mode is a normal operating mode; and
the generator is operational in a second mode of the multiple modes.

16. The control system according to claim 15, wherein:
the second mode is an abnormal mode, or
the second mode is a takeoff or ascent mode.

17. The control system according to claim 15, wherein:
the generator is operational in a third mode of the multiple modes;
the second mode is a takeoff or ascent mode; and
the third mode is an abnormal mode.

18. The control system according to claim 8, further comprising:
a battery level detection device configured to determine a charge level of at least one battery of the first electric power source and provide the determined charge level to the control unit; and
one or more switches configured to be controlled by the control unit and configured to direct the second electric power to the first electric power source, the second electric power source, another electric power source, the plurality of rotors, or an emergency landing system responsive to control signals from the control unit, the control signals generated based on the determined charge level and one or more thresholds including the threshold.

19. A method comprising:

detecting a remaining capacity of a first battery of a plurality of batteries of a first electric power source of an electric helicopter while the first battery supplies electric power to at least one rotor of the electric helicopter;

comparing the remaining capacity of the first battery to a threshold;

responsive to determining that the remaining capacity of the first battery is less than the threshold, charging the first battery based on second electric power generated by a generator of the electric helicopter that has been converted from motive power from an engine of the electric helicopter;

switching to a second battery of the plurality of batteries to supply the electric power to the at least one rotor of the electric helicopter responsive to determining that the remaining capacity of the first battery is less than the threshold, wherein the threshold is set such that an auxiliary remaining capacity remains in the first battery after switching to the second battery; and supplying the electric power of the auxiliary remaining capacity that remains in the first battery to an emergency landing system responsive to an abnormal situation.

* * * * *